Aug. 3, 1943.  W. LA HODNY ET AL  2,325,615
MOUNTING FOR REAR VISION MIRRORS
Filed May 23, 1940  2 Sheets-Sheet 1
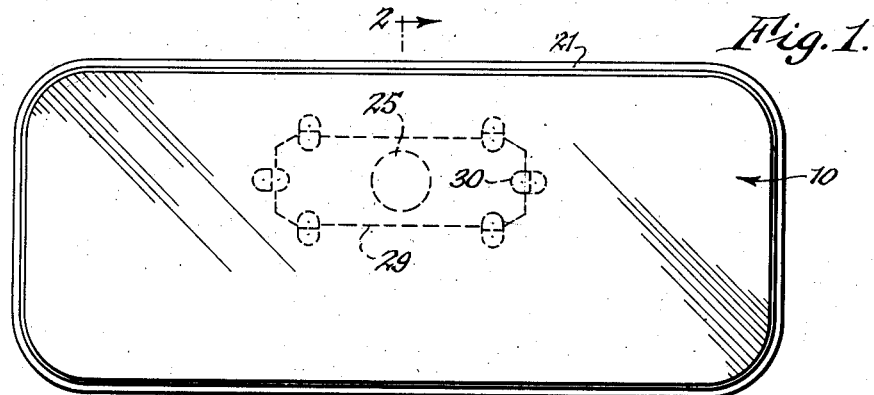
Fig. 1.
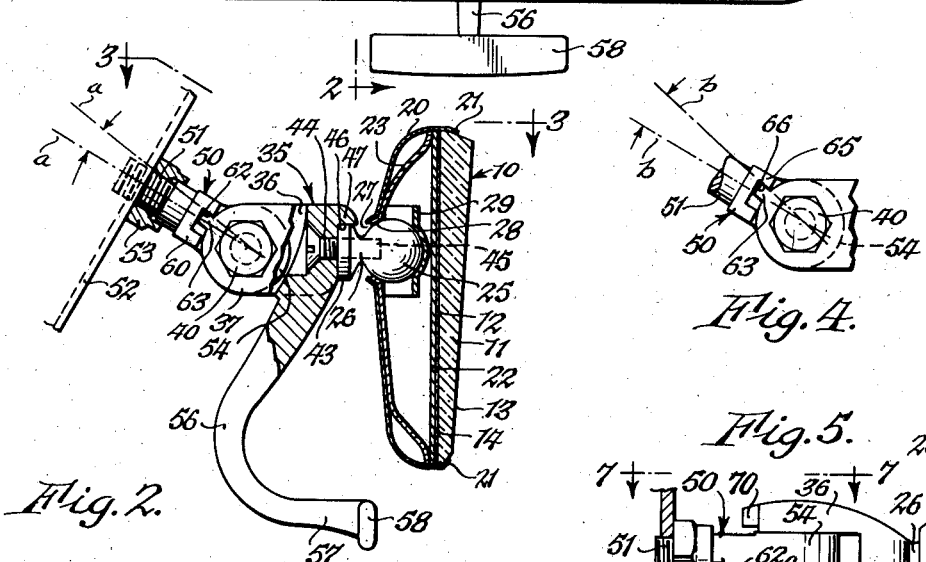
Fig. 2.  Fig. 4.  Fig. 5.
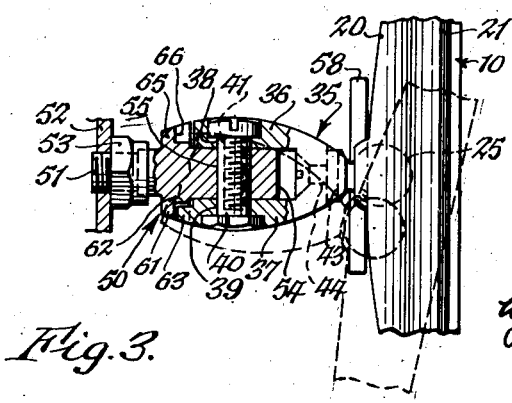
Fig. 3.
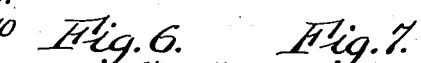
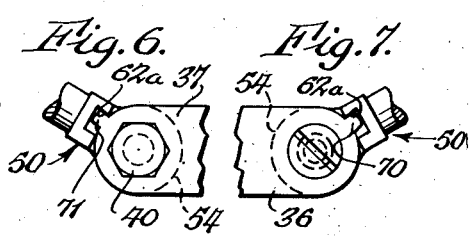
Fig. 6.  Fig. 7.
William La Hodny
Paul Bertell  INVENTORS
BY Popp & Popp
ATTORNEYS

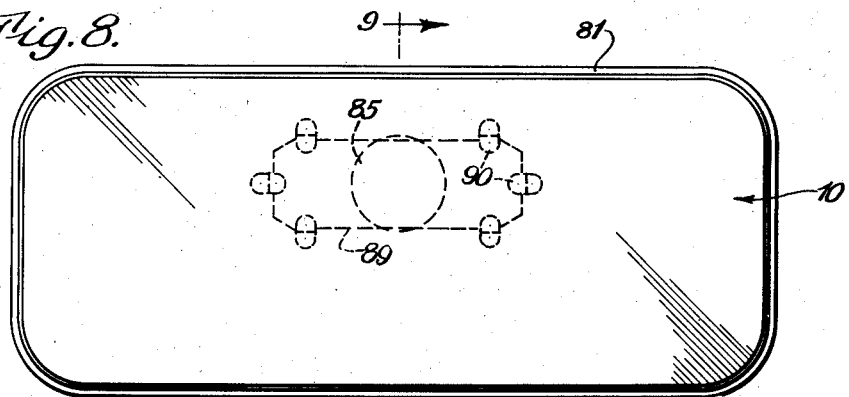
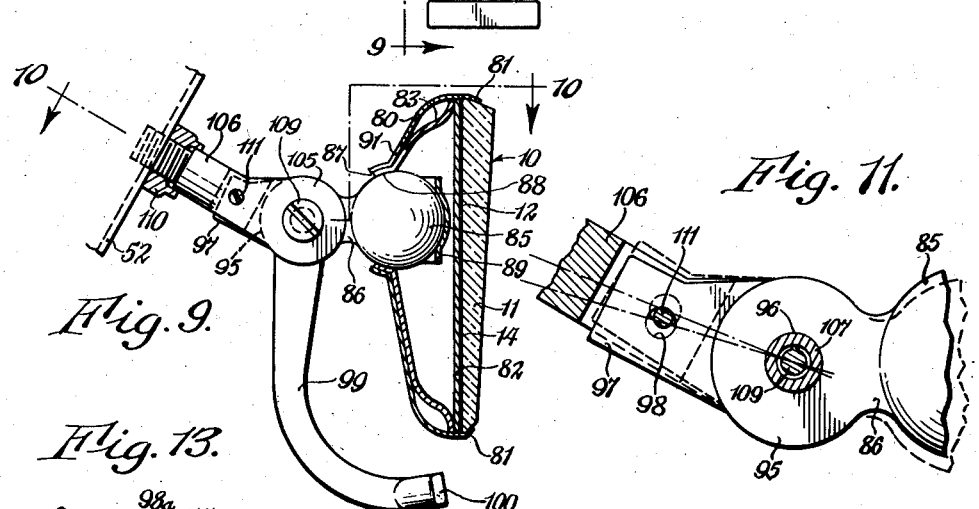
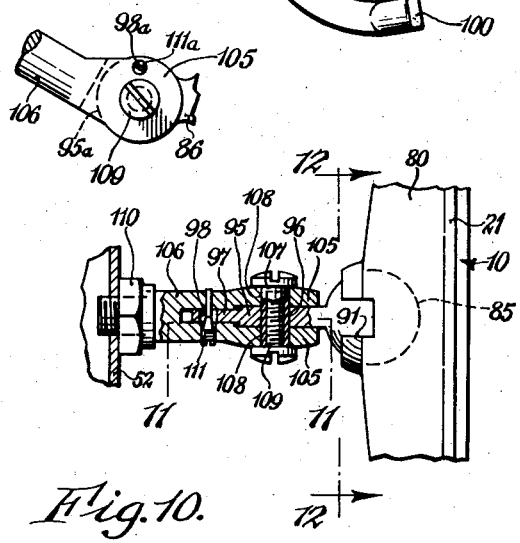
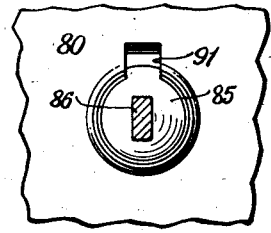

Patented Aug. 3, 1943

2,325,615

UNITED STATES PATENT OFFICE 2,325,615

MOUNTING FOR REAR VISION MIRRORS

William La Hodny and Paul Bertell, Buffalo, N. Y., assignors to Standard Mirror Company, Buffalo, N. Y., a corporation of New York Application May 23, 1940, Serial No. 336,738

8 Claims. (Cl. 88—98)

This invention relates to a mounting for rear vision mirrors and more particularly to a mounting for a prismoidal rear vision mirror which reflects a primary and secondary image, the mirror being movable by the driver of the automobile to reflect the primary bright image from the highly reflective coating of the mirror during normal daytime driving and being movable at night to reflect the secondary dull image from the front face of the mirror, thereby to avoid a blinding glare of headlights of cars following the automobile. The mounting can, however, be used in connection with the usual plane rear vision mirror, the mounting permitting the mirror to be manually swung to an inoperative position to avoid the reflection of glaring headlights into the eyes of the driver and to be manually restored to its operative and properly adjusted position after the objectionable condition has ceased to exist.

The principal object of the invention is to provide a simple and inexpensive mounting for a rear vision mirror which permits the mirror to be freely adjusted about its vertical and horizontal axis, and also leveled, to suit the height and position of the driver, and at the same time permits the manual movement of the mirror, within a controlled arc, without disturbing the said adjustment of the mirror.

Another object of the invention is to provide simple means for limiting the movement of the mirror in said arc so that the driver has merely to move the mirror through said arc to one of two extreme positions to obtain the primary bright or secondary dull image when the rear vision mirror is a prismoidal mirror, or to move the mirror from its operative to an inoperative position when the rear vision mirror is a plane mirror.

Another object of the invention is to provide a handle for so moving the mirror through said arc so that the movement of the mirror is effected by the simple expedient of moving the handle to one of its two extreme positions.

Another object is to provide such a handle for angling the mirror through such controlled arc in which the handle and the parts actuated by it are wholly dissociated from the means for leveling and adjusting the mirror to meet any particular driving conditions whereby the manipulation of the handle cannot disturb such adjustment.

Another purpose is to provide such a handle which is conveniently disposed and of such form as to be readily moved to either of its extreme positions without interfering with the driving of the car.

Another aim is to provide such a mounting which, in addition to being inexpensive in construction, is simple and neat in appearance so as to provide an automobile accessory which is attractive in appearance and in harmony with the other interior fittings of the automobile.

Another object is to provide such a mounting which is free from vibration so as to avoid disturbing blurring of the image by vibration.

Another aim is to provide a simple means, where a prismoidal mirror is employed, for encasing the prismoidal mirror in which the danger of breaking the relatively expensive prismoidal mirror either in the course of producing the rear vision mirror assembly or while in service is avoided.

In the accompanying drawings:

Fig. 1 is a front elevation of a prismoidal rear vision mirror assembly having a mounting embodying our invention.

Fig. 2 is a vertical central section thereof, taken on line 2—2, Fig. 1 and showing the position of the mirror in which it reflects the secondary image to the eye of the driver.

Fig. 3 is a fragmentary, generally horizontal section, taken on line 3—3, Fig. 2. This figure also shows, in dotted lines, the manner in which the attaching stud can be bent so that its effective axis is generally in line with the line of vision of the driver.

Fig. 4 is a fragmentary view similar to Fig. 2 showing the head bar attaching stud reversed so as to obtain a greater movement of the mirror through its controlled vertical arc in shifting the mirror to reflect either the primary or the secondary image.

Fig. 5 is a fragmentary, top plan view of a slightly modified form of the invention in respect to the means for obtaining an adjustment of the degree to which the mirror can be moved through its controlled vertical arc in shifting from the primary to the secondary image and vice versa.

Fig. 6 is a fragmentary side elevation of the form of mounting shown in Fig. 5 viewed from line 6—6, Fig. 5.

Fig. 7 is a fragmentary side elevation viewed from the opposite side of Fig. 5 on line 7—7, Fig. 5 and also showing the head bar attaching stud reversed so as to obtain a greater movement of the mirror through its controlled vertical arc in shifting the mirror to reflect either the primary or the secondary image.

Fig. 8 is a front elevation similar to Fig. 1 and showing a modified form of the invention.

Fig. 9 is a vertical section, taken on line 9—9, Fig. 8.

Fig. 10 is a generally horizontal section, taken on line 10—10, Fig. 9.

Fig. 11 is a fragmentary vertical section, taken on line 11—11, Fig. 9.

Fig. 12 is a fragmentary vertical section, taken on line 12—12, Fig. 11.

Fig. 13 is a fragmentary view similar to Fig. 9 and showing a further slightly modified form of the invention corresponding generally to the form illustrated in Figs. 8–12.

The invention is shown as embodied in a mounting for a prismoidal mirror which is indicated generally at 10, although it will be understood that the mirror can also be used to support a plane mirror in which case the handle control as hereinafter described is merely used to move the mirror from an operative to an inoperative position and vice versa. The prismoidal mirror 10 is shown as made of a generally rectangular plate of glass 11 which is ground so that the vertical axis of its rear planar face 12 is at an angle to the vertical axis of its front planar face 13, but the horizontal axes of these faces are parallel. The mirror 10 is thereby wedge shaped in vertical section and is arranged with its thicker part at its upper end. The glass plate 11 is provided on its rear face 12 with a coating 14 of reflective material, this coating being preferably of a highly reflective metal, such as silver, in view of the fact that a dulled effect is obtained through using the secondary image reflected by the front face 13 of the glass panel 11. This glass panel 11 is also shown as being beveled around its edges, the beveling around the upper part of the mirror being at a lesser angle than the beveling around the bottom of the mirror. The glass plate is also shown as being rounded at its corners to provide a mirror of pleasing shape.

The mirror is held by a metal backing plate or case 20, the edges 21 of which conform to the edges of the mirror plate 11 and these edges 21 being bent around the beveled edges of the glass plate 11, as best indicated in Fig. 2, these bent edges thereby holding the glass plate against forward displacement. In order to hold the glass plate 11 against rearward displacement the mirror plate 11 is backed by a paper protecting sheet 22 and a metal liner plate 23 is arranged within the case 20, the edges of this liner plate 23 bearing against the rear face of the paper protecting sheet 22 at its edges and the central part of the metal lining plate 23 bearing against the inner face of the case 20, as best shown in Fig. 2.

To permit of adjusting the mirror about its vertical and horizontal axis to suit the height and position of the driver, and also to permit of leveling the mirror after having been so adjusted the encased mirror, as just described, is shown as carried on a ball 25 having a stem 26. For this purpose the back of the case 20 and its metal liner plate 23 are formed to provide an opening 27 and the metal surrounding this opening is formed to provide a seat 28 engaging an annular portion of the rear surface of the ball 25, the stem 26 of this ball extending through the opening 27. The ball 25 is held in firm frictional engagement with its seat 28 by a plate 29 made of spring metal and formed to receive the front end of the ball 25. The ends of this plate 29 are sprung rearwardly and held by six fingers 30 punched forwardly from the metal liner 23 and bent over the edge of the spring strip 29. It will be seen, assuming the stem of the ball 25 to be held stationary, that the driver can grasp the edge of the mirror case and swing it around both its vertical and horizontal axes to obtain a clear view through the rear window of the automobile and can also level the mirror after it has been so adjusted. This adjustment will vary with each individual driver and it is one of the objects of the invention to preserve this adjustment when the mirror is swung to reflect either its bright image or its dull image into the eyes of the driver.

With the prismoidal mirror as shown it will be seen that a primary and a secondary image is reflected. The primary image is reflected by the highly reflective coating 14 of the rear face 12 of the glass mirror panel 11. The secondary image is reflected by the polished front face 13 of the glass mirror panel 11. The vertical axes of the rear and front faces 12 and 13 of the glass mirror panel 11 are arranged at such angle that the angles of incidence and reflection of the front face 13 are greater than the corresponding angles of the reflective coating 14 so that the primary bright image is reflected above the secondary dull image at the eye of the driver. To permit of using either of these images means are provided for rotating the mirror through a vertical angle so as to bring either the upper primary image or the lower secondary image to the eyes of the driver.

For this purpose the stem 26 of the ball 25 is secured to a fork 35, the arms 36 and 37 of which project rearwardly parallel with the axis of the stem 26. The inner vertical faces of these arms 36, 37 are arranged parallel to each other and these arms are provided with alining openings 38, 39 adapted to receive a pivot pin 40, the hexagonal head of which is recessed into the opening 39. This pivot pin is held in position by a screw 41 which is screwed into a threaded bore provided in the pivot pin 40 and the round head of which is recessed into the opening 38.

Any suitable means can be provided for securing the fork 35 to the end of the stem 26 and as shown this stem is provided at its rear end with an annular enlargement 43 having a rear flat face which fits against a correspondingly forwardly facing flat face of the fork 35. A concealed screw 44 extends forwardly from between the two arms of the fork 35 through an opening provided at the front end of the fork 35 and into a threaded axial opening 45 in the stem 26 of the ball 25. The stem 26 is prevented from turning relative to the fork 35 by providing a flat 46 in the upper part of its enlarged annular portion 43, this flat 46 being engaged by a finger 47 provided in the upper front part of the fork 35.

The fork 35 is supported by a head bar attaching stud 50, the shank 51 of which is threaded to screw into the head bar 52 of the automobile, the stud being held against turning by the tightening of a nut 53 against the head bar. The stud 50 is formed to provide an enlarged annular head 54 provided with an axial opening 55, the horizontal axis of which is arranged at right angles to the axis of the shank of the stud 50. The head 54 is formed to provide opposite parallel faces which frictionally engage the inner parallel faces of the arms 36 and 37 of the fork 35, the pivot pin 40 extending through the opening 55 in the head 54 and the frictional engagement between the corresponding flat faces of the fork 35 and head 54 of the stud 50 being maintained by the screw 41.

In order to swing the mirror around the pivot pin 40 as an axis so as to bring either the primary or secondary image into the eyes of the driver, a handle 56 is formed integrally with the fork 35 and is shown as extending downwardly therefrom, although it will be understood that this handle could extend upwardly from the fork if it were desired to manipulate the handle from the top instead of the bottom of the mirror. This handle 56 preferably curves rearwardly to permit the free adjustment of the encased mirror around the ball 25 and its lower end 57 is extended forwardly to a transverse bar 58 which is preferably arranged immediately adjacent the lower edge of the encased mirror panel and substantially parallel therewith. It will therefore be seen that to swing the mirror so as to reflect the secondary image it is merely necessary for the operator to pull the cross bar 58, thereby swinging the fork 35 counterclockwise, as viewed in Fig. 2, around the axis of the pivot pin 40 so as to swing the lower edge of the mirror panel 10 toward him and bring the secondary image into his view. This position of the parts is illustrated in Fig. 2. Conversely, during daytime driving when the driver desires the primary image he pushes on the bar 58 thereby to swing the fork 35 clockwise about the pivot pin 40, as viewed in Fig. 2, so as to bring the primary image reflected by the coating 14 into his view.

The movement of the fork 35 around the axis of the pivot pin 40 which is necessary to bring either the primary or the secondary image into the eyes of the driver of the automobile is about 3½°. In order to facilitate the adjustment of the mirror positive stop means are provided for restricting the rotation of the fork 35 around the pivot pin 40 to this 3½°. For this purpose the stud 50 is provided with a collar 60, one side of which is provided with a laterally extending lug 61, this lug being formed to provide a notch 62. The corresponding arm 37 is formed to provide a finger 63 which extends into the recess 62. The finger is slightly smaller, in its direction of rotation, than the notch 62 and it will therefore be seen that a limited play is provided between the notch and the finger, this play permitting 3½° of rotation of the fork 35 into vertical plane. By this means it will be seen that no care need be exercised by the driver in adjusting the rear vision mirror to provide either the primary or secondary image, it being merely necessary for him to push or pull the cross bar 58 of the arm 56 within the limit set by the fit of the finger 63 within the notch 62.

To insure the maintenance of the proper set position of the mirror panel, regardless of whether it is set by the manipulation of the handle 56 to reflect either the primary or the secondary image into the eyes of the driver, it may be desirable to bend the attaching stud 50 in the manner shown by dotted lines in Fig. 3. As there shown, the stud is bent so as to be generally coincident with the line of vision of the driver and hence so that its pivot pin 40 is arranged at right angles to the line of vision of the driver instead of parallel with the head bar 52, as illustrated in full lines. With the stud 50 bent in this manner there is no tendency for the angling of the mirror through the handle 56 to alter the setting of the mirror panel on the ball 25 as by causing the right hand side of the mirror to drop slightly out of line as might be the case if the stud 50 is straight, as indicated by full lines in Figs. 1–4.

As a matter of practical manufacture it may be difficult to produce prismoidal mirrors with sufficient accuracy to match, exactly, the 3½° movement permitted by the finger 63 in the notch 62. Under such circumstances the notch 62 would be proportioned to provide, say, a 3¼° movement of the fork 35 and an additional lug 65 is provided on the opposite side of the neck 60 from the lug 61. This lug is then provided with a notch 66, as shown in Figs. 3 and 4 which is similar to the notch 62 except that it is slightly larger. Thus, when the finger 63 is arranged in the notch 62, as illustrated in Fig. 3, the fork 35 would have, say, a 3¼° movement. If, through a factory screen test, it is determined that the mirror has a slightly greater movement, the stud 50 would be reversed during assembly, as illustrated in Fig. 4, so that the finger 63 would engage the notch 66 instead of the notch 62. This notch 66 is slightly larger and would afford, say, a 3¾° movement of the fork 35 around the pivot pin 40. By this means an adjusting of one-half a degree is provided to compensate for any irregularities in the production manufacture of the prismoidal glass panel 11. The difference in the angle of adjustment permitted by the parts arranged as in Fig. 2 and the parts as arranged in Fig. 4 is illustrated by the broken lines $a$—$a$ and $b$—$b$, respectively, in these figures, the angle $b$—$b$ being greater than the angle $a$—$a$. It will be understood that as illustrated these angles are very much exaggerated.

It is apparent that instead of providing two notches 62 and 66 on the stud 50 and a single finger 63 on the fork, it is possible to provide two fingers on the fork engaging in one notch in the stud. Such a slightly modified construction is illustrated in Figs. 5–7 in which each arm of the fork is provided with a finger 70, 71, these lugs being each engageable with a recess 62a provided in the stud 50 in the same manner as with the recess 62 in the form of the invention shown in Figs. 1–4. The finger 71 is slightly smaller than the finger 70 and it will therefore be seen that when the stud 50 is fitted in the manner shown in Fig. 6 that the mirror will have a comparatively large angular movement of, say, 3¾° and that when the stud is reversed so that the finger 70 is engaged in the notch 62a, as illustrated in Fig. 7, the mirror will have a comparatively slight degree of movement. It will therefore be seen that the form of the invention shown in Figs. 5–7 provides an ability of adjustment in the manufacture of the mirror assembly to compensate for slight variations in the manufacture of the prismoidal glass in the same manner as in the form of the invention shown in Figs. 1–4. Since in other respects the constructions are identical the same reference numerals have been applied.

In the modified form of the invention illustrated in Figs. 8–12, the prismoidal mirror is identical with that shown in Figs. 1–7 and hence the same reference numerals have been employed.

This prismoidal mirror, in the form of the invention illustrated in Figs. 8–12, is shown as held in a metal backing plate or case 80, the edges 81 of which conform to the edges of the mirror plate 11 and these edges 81 being bent around the beveled edges of the glass plate 11, as best illustrated in Fig. 9, these bent edges thereby holding the glass plate against forward displacement. In order to hold the glass plate 11 against rearward displacement the mirror plate 11 is backed by a paper protecting sheet 82 and a metal liner plate 83 is arranged within the case 80, the upper edges of this metal liner plate 83 bearing against the rear face of the paper protecting sheet 82 at its edges and the central part of the metal liner plate 83 bearing against the inner face of the case 80, as best shown in Fig. 9.

To permit of adjusting the mirror about its vertical and horizontal axis to suit the height and position of the driver, and also to permit of leveling the mirror after having been so adjusted, the encased mirror, as in the form of the invention shown in Figs. 1-7, is shown as carried on a ball 85 having a stem 86. The ball 85 is, however, substantially larger than the ball 25 supporting the form of the mirror shown in Figs. 1-7. To seat against the ball 85, the back of the case 80 and its metal liner plate 83 are formed to provide an opening 87 and the metal surrounding this opening is formed to provide a seat 88 engaging an annular portion of the rear surface of the ball 85, the stem 86 of this ball extending through the opening 87. The ball 85 is held in firm frictional engagement with its seat 88 by a plate 89 made of spring metal and formed to receive the front end of the ball 85. The ends of this plate 89 are sprung forwardly and held by six fingers 90 punched forwardly from the metal liner 83 and bent over the edges of the spring strip 89. It will be seen that the encased mirror can be adjusted about the ball 85 to suit the height and position of the driver in the same manner as with the form of the invention shown in Figs. 1-7. In addition, however, both the metal case 80 and the metal liner plate 83 are slotted, as indicated at 91, this slot extending upwardly from the opening 87 for the ball stem.

To permit of shifting the mirror to reflect either the primary or the secondary image to the eyes of the driver without disturbing the adjustment of the mirror about the ball 85, the stem 86 of the ball is formed to provide an integral, flat, vertical tang 95 of round form. This tang is provided with a coaxial opening 96 and is also provided with a flat tail piece 97 having a transverse hole 98. Projecting downwardly from the flat tang 95 is an integral handle 99, the end of which can be provided with an integral cross bar 100. As with the handle 56 in the embodiment of the invention shown in Figs. 1-7, the handle 99 is preferably curved to permit the free adjustment of the mirror about the ball 85 without interference from this handle.

Since the ball 85, stem 86, tang 95, tail piece 97, handle 99 and cross bar 100 are all cast, preferably, by die casting, as a single integral metal part, it is apparent that the parts of this casting must be so proportioned as to be capable of being inserted or threaded through the opening 87 from the front of the metal case 80 and metal liner plate 83 before the glass mirror panel 11 is crimped in place. For this purpose the length of the cross bar 100 is limited so as to be capable of being passed through the opening 87, this being effected by inserting first one end of the cross bar through the opening until the handle 99 engages one side of this opening and then swinging the other end of the cross bar 100 through this opening. The handle 99 is then threaded through the opening 87 until the tail piece 97 is encountered. This tail piece is of less thickness than the width of the slot 91 and this slot is of such length as to permit the passage of this tail piece. The tang 95 is of smaller diameter than the opening 87 and hence it will be seen that the ball 85 can be drawn into engagement with the seat 88 surrounding this opening. Thereafter the spring metal plate 89 can be positioned and stressed so that its edges can be secured by the fingers 90 and the glass mirror plate can be positioned and the edges of the case 80 crimped around its margin. It will be seen that by making the ball 85, stem 86, tang 95, tail piece 97, handle 99 and cross bar 100 in the form of a single casting, the necessity for the screw 44 is eliminated and hence the mirror assembly is cheaper in cost of materials and assembly and also can be made much more compact.

The tang 95 and tail piece 97 are embraced by the two jaws 105 of a bifurcated stud 106 which is screwed into the head bar 52 of the automobile. The inner faces of these jaws 105 are held in frictional engagement with the flat vertical faces of the tang 95 by a pivot pin 107 which passes through opening 108 provided in the jaws 105 and through the opening 96 in the tang 95. The head of this pivot pin bears against one of the jaws 105 and pressure is exerted against the jaws by a screw 109 which is screwed into a threaded bore provided in the pivot pin 107 and the head of which bears against the other jaw 105. The bifurcated stud 106 is held in position in the head bar 52 by a locking nut 110.

In order to limit the movement of the mirror assembly around the axis of the pivot 107 to the extent required to bring the primary or the secondary image to the eyes of the driver, a screw 111 is screwed into a threaded opening provided in one of the jaws 105 and extends through the opening 98 in the tail 97 and into the opposite jaw 105. The part of the screw 111 which extends through the opening 98 in the tail piece is shown as being of tapering form so as to permit of adjusting the effective size of this pin by screwing it in and out to a greater or less degree. The size of the opening 98 in the tail piece 97 is such as to provide, say, a 3½ degree movement of the mirror panel 10, this mirror being tapered to bring either its primary or secondary image to the eyes of the driver. If in the production grinding of the mirrors it is inexpedient to grind the mirrors to produce exactly this effect, the mirrors can be subjected to a factory screen test and the screw 111 adjusted to provide a slightly greater or slightly less amplitude of movement as the particular mirror may require.

It is apparent that the tail piece 97 is not essential to the invention although it is desirable in that it permits the hole 98 to be located a greater distance from the axis of the pivot pin 107 than if this hole were provided directly in the tang 95. The further this hole can be disposed away from this axis, the less the necessity, of course, for extreme accuracy in the shape of the hole so that the use of the tail piece 97 is preferred. However, as illustrated in Fig. 13, the piece 97 can be eliminated and the hole 98a for the reception of the tapered pin 111a can be provided directly in the tang 95a, the parts in the form of the invention shown in Fig. 13 otherwise conforming exactly to the form of the invention illustrated in Figs. 8-12. With the elimination of the tail 97, as illustrated in Fig. 13, it is, of course, unnecessary to provide the slot 91 in the mirror case 80 and inner backing plate 83, as the only purpose of this slot is to permit the tail piece to be passed through these parts in assembling the mirror as previously discussed.

From the foregoing it will be seen that the present invention provides a mirror in which a handle is provided for swinging the mirror panel to reflect either the primary or secondary image into the eyes of the driver, where the mirror is of prismoidal form, without in any way affecting the adjustment of the mirror to suit the particular driving conditions. It will also be seen that this movement of the mirror is easily effected and is positively limited so that the driver need only push or pull the lever to its extreme position to obtain either of the images. It will further be seen that the instrument as a whole can be produced at low cost, which is an essential factor in accessories of this character and further that it is neat in appearance so as to provide an attractive automobile accessory.

We claim as our invention:

1. A rear vision mirror, comprising a transparent panel having a reflective coating on its rear face, a supporting stud adapted to be secured to a rigid part of an automobile adjacent the windshield and having an extension extending lengthwise of the automobile, a holder for said mirror panel and provided with an annular seat, a ball, means for frictionally holding said ball in engagement with said seat, a stem projecting rearwardly from said ball and formed to provide an extension, one of said extensions being formed to provide a pair of vertical jaws and the other extension being formed to provide a vertical tang fitted between said jaws, a horizontal pivot pin extending through said jaws and tang whereby said stem can oscillate about the axis of said pivot pin, means providing frictional engagement between said jaws and tang to resist such oscillation, and means mounted on said extensions for limiting said oscillating movement of said stem about the axis of said pivot pin.

2. A rear vision mirror, comprising a reflective panel, a support adapted to be secured to a rigid part of an automobile adjacent the windshield and having an extension, a backing plate secured to said mirror panel and forming a support therefor, said backing plate being provided with an opening and being formed around said opening to provide an annular seat which faces said mirror panel, a one piece member comprising a ball, a stem, an extension on said stem, and a laterally extending handle inserted through said opening from the side thereof facing said mirror panel to engage said ball with said seat with the remainder of said parts of said member arranged in rear of said backing plate, and a pivot pin connecting said extensions to permit said mirror panel to be oscillated by said handle around the axis of said pivot pin.

3. A rear vision mirror, comprising a reflective panel, a support adapted to be secured to a rigid part of an automobile adjacent the windshield and having an extension, a backing plate secured to said mirror panel and forming a support therefor, said backing plate being provided with an opening and being formed around said opening to provide an annular seat which faces said mirror panel, a one piece member comprising a ball, a stem, an extension on said stem and a laterally extending handle inserted through said opening from the side thereof facing said mirror panel to engage said ball with said seat with the remainder of said parts of said member arranged in rear of said backing plate, a pivot pin connecting said extensions to permit said mirror panel to be oscillated by said handle around the axis of said pivot pin, and means for limiting said oscillation of said mirror panel around the axis of said pivot pin.

4. A rear vision mirror, comprising a reflective panel, a support adapted to be secured to a rigid part of an automobile adjacent the windshield and having an extension, a backing plate secured to said mirror panel and forming a support therefor, said backing plate being provided with an opening and being formed around said opening to provide an annular seat which faces said mirror panel, a one piece member comprising a ball, a stem, an extension on said stem, a tail piece and a laterally extending handle inserted through said opening from the side thereof facing said mirror panel to engage said ball with said seat with the remainder of said parts of said member arranged in rear of said backing plate, a pivot pin connecting said extensions to permit said mirror panel to be oscillated by said handle around the axis of said pivot pin, and means for limiting said oscillation of said mirror panel around the axis of said pivot pin comprising a pin carried by said extension of said support and passing through an opening provided in said tail piece.

5. In a mounting for a rear vision mirror panel provided with a reflective coating on its rear face and having a holder for said mirror panel, the combination of a supporting stud adapted to be secured to a rigid part of an automobile adjacent the windshield and having an extension, a horizontal pivot pin carried by said extension and extending transversely of the automobile, means interposed between said holder and said supporting stud and pivotally supported at one end on said pivot pin to oscillate about the axis thereof, a universal friction joint connecting the other end of said interposed means with said holder and permitting free adjustment of said mirror panel relative to said interposed means, means providing frictional engagement between said extension of said stud and said interposed means to prevent normal relative oscillating movement thereof about the axis of said pivot pin, means between said extensions of said stud and said interposed means for limiting said oscillating movement of said interposed means about the axis of said pivot pin to permit a predetermined movement of said mirror panel without disturbing said freely adjustable universal connection between said mirror panel and said interposed means, and manual means for so oscillating said interposed means about the axis of said pivot pin, comprising a handle rigidly connected to said interposed means and extending laterally therefrom in position to be manipulated by the hand of the driver of the automobile.

6. In a mounting for a transparent mirror panel which has a reflective coating on its rear face and having a holder for said mirror panel provided with an annular seat, the combination of a supporting stud adapted to be secured to a rigid part of an automobile adjacent the windshield and having a head with opposite, vertical, parallel faces extending lengthwise of the automobile, a horizontal pivot pin carried by said head and extending perpendicularly outward from said parallel faces, a ball, means for frictionally holding said ball in engagement with said seat, a stem projecting rearwardly from said ball, a fork secured to said stem and having its jaws provided with inner parallel faces engaging the said parallel faces of the head of said stud, said jaws being provided with alining holes receiving the ends of said pivot pin, means between the head of said stud and said fork for limiting the oscillating movement of said jaws about the axis of said pivot pin, and manual means for so oscillating said jaws about the axis of said pivot pin, comprising a handle rigidly secured to said fork and extending laterally therefrom and a cross bar at the end of said handle and arranged adjacent one horizontal edge of said mirror panel to be conveniently manipulable by the hand of the driver, said handle being shaped as to avoid interference with the adjustment of said mirror panel through its ball and socket connection with said fork.

7. In a mounting for a rear vision mirror panel having a support adapted to be secured to a rigid part of an automobile adjacent the windshield thereof and having an extension and a holder for said mirror panel, the combination of means interposed between said support and holder, means providing a connection between said holder and said interposed means and permitting free adjustment of said mirror panel relative to said interposed means, said interposed means being provided with an extension, a pivot pin connecting said extensions, and means comprising a pin mounted in one of said extensions eccentrically of the axis of said pivot pin and arranged in an opening provided in the other extension for limiting the movement of said interposed means about the axis of said pivot pin.

8. In a mounting for a rear vision mirror panel provided with a reflective coating on its rear face and having a holder for said mirror panel, the combination of a supporting stud adapted to be secured to a rigid part of an automobile adjacent the windshield and having an extension, a horizontal pivot pin carried by said extension and extending transversely of the automobile, a member interposed between said holder and said supporting stud and having an extension at one end pivotally supported on said pivot pin to oscillate about the axis thereof and having a face extending transversely of said pivot pin and frictionally engaging a companion face on said extension of said stud, a universal friction joint connecting the other end of said interposed member with said holder and permitting free adjustment of said mirror panel relative to said interposed member, and means for limiting the movement of said interposed member about the axis of said pivot pin comprising a threaded pin adjustably screwed into one of said extensions eccentrically of the axis of said pivot pin and having a longitudinally tapered portion arranged in an opening provided in the other extension.

WILLIAM LA HODNY.
PAUL BERTELL.